In some thermal protection arrangements for
motors, a thermal responsive device, such as thermal re-
sponsive switch, is disposed adjacent end turns of the sta-
tor winding of the motor so that it is subjected to the
heat generated by the stator winding. The thermal re-
sponsive switch is generally connected in a thermal pro-
tective circuit which is adapted to interrupt the power
supplied to the motor whenever the temperature of the
winding reaches a predetermined value.

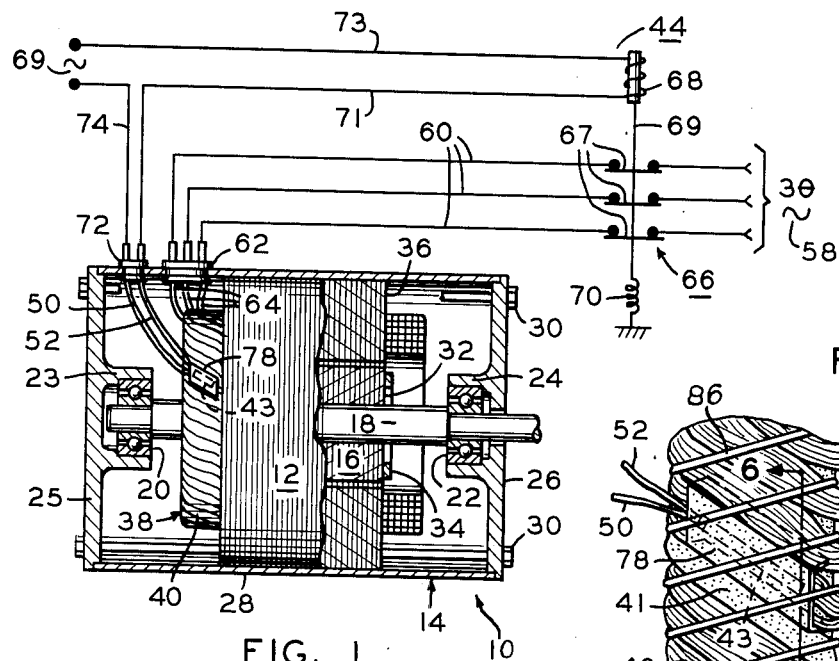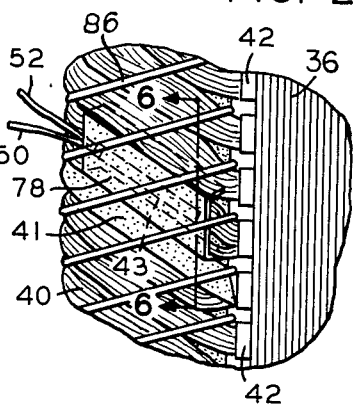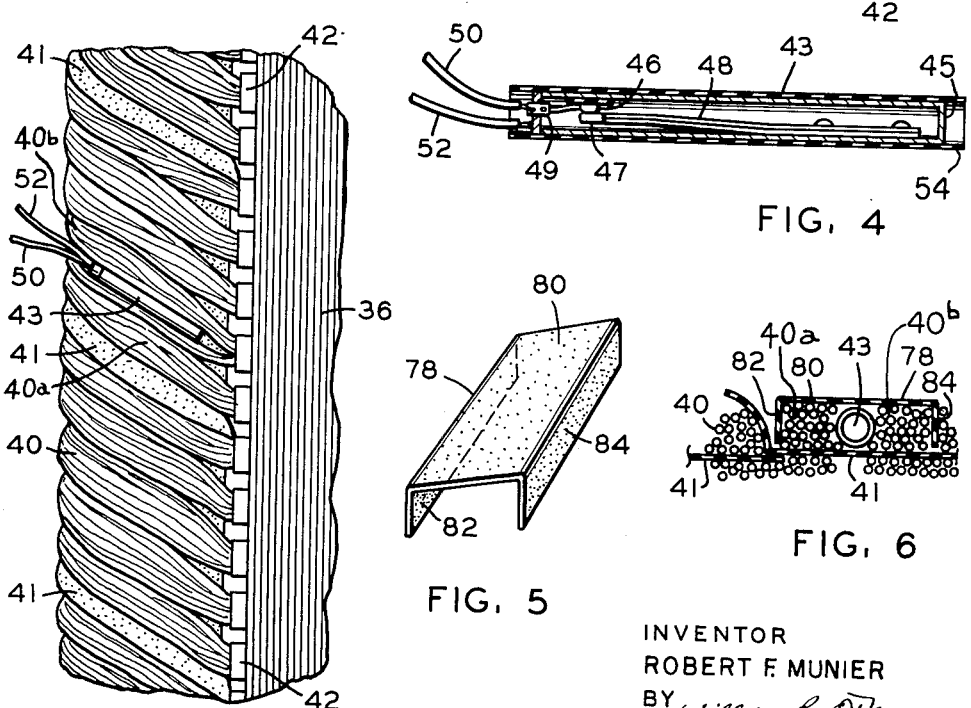
FIG. 1
FIG. 2
FIG. 3
FIG. 4
FIG. 5
FIG. 6
INVENTOR
ROBERT F. MUNIER
BY William R. O'Meara ial protection means
for an electric motor and more particularly to an im-
proved thermal protection arrangement for interrupting
the power supplied to a motor whenever the temperature
thereof reaches a predetermined value.

In the past, such thermal protective arrangements only
operated satisfactorily to protect the motor against cer-
tain types of faults or overload conditions. While past
protective arrangements protected the motor where an
overload condition caused the temperature of the winding
to increase at a relatively slow rate, such arrangements
often did not provide adequate protection, for example,
when an overloading condition occurred, such as when a
locked rotor condition occurred. This was because the
thermal protective device did not respond quickly enough
to a rapid rise in winding temperature, such as caused by
a locked rotor condition. Thus, there was the danger of
damage to the insulation of the windings before the
protective device operated to interrupt the power sup-
plied to the motor.

It is, therefore, an object of the present invention to
provide an improved thermal protective arrangement for
an electric motor wherein the motor is protected against
not only conditions which cause the winding temperature
to increase at a relatively slow rate, but also conditions
which cause the winding temperature to increase at a rela-
tively rapid rate.

Another object is to provide in an electric motor an
improved thermal protective arrangement in which a
thermal protective device is disposed adjacent a winding
of the motor and wherein simple and effective means are
provided for decreasing the response time of the thermal
responsive device so that the protective device quickly
responds to relatively rapid changes in winding tem-
perature.

These and other objects and advantages of the present
invention will be apparent from the following detailed
description and drawing wherein a preferred embodiment
of the present invention is clearly shown and wherein
like reference numerals refer to like parts.

In the drawing;

FIG. 1 is a cross-sectional view of an electric motor
embodying the present invention;

FIG. 2 is an enlarged fragmentary plan view of the left-
hand end portion of the stator of the motor of FIG. 1
shown in greater detail;

FIG. 3 is an enlarged fragmentary plan view of the
left-hand end portion of the stator of FIG. 1 but with cer-
tain parts removed;

FIG. 4 is an enlarged cross-sectional view of a thermal
protective device employed in the present invention;

FIG. 5 is a perspective view of a heat radiation barrier
member employed in the present invention; and FIG. 6 is an enlarged cross-sectional view taken along
the line 6—6 of FIG. 2, and rotated 90°.

Briefly, in accordance with the present invention, a
heat radiation barrier is disposed adjacent a thermal
responsive device positioned within the end turns of a
motor winding to limit the transfer of heat from the end
turns to the atmosphere and increase the transfer of
heat from the end turns to the thermal responsive device.

Referring now to the drawing, there is shown in FIG.
1 a three-phase electric induction motor 10 which in-
cludes a stator 12 secured within a casing 14, and a rotor
16 mounted for rotation within the stator 12. A shaft
18, to which the rotor 16 is secured, is supported for
rotation by bearings 20 and 22 mounted respectively in
hubs 23 and 24 of end plates 25 and 26 which are secured
to the opposite ends of a frame 28 of the casing 14 by
through-bolts 30.

The rotor 16 is shown as a conventional squirrel-cage
type rotor which includes a laminated iron core 32 with
end rings 34 (one shown) which connect the opposite
ends of electrical conductors extending through slots
(not shown) in the core 32.

The stator 12 includes a laminated iron stator core 36
and a three-phase stator winding 38. The winding 38
includes a plurality of coils for each phase disposed in
slots around the stator core, and with end turns or end
coils of the winding, indicated generally at 40 extend-
ing axially beyond the ends of the stator core 36.

The end turns 40 are shown in greater detail in FIGS.
2 and 3, and especially in FIG. 3 wherein certain parts
of the stator are removed for clarity. The stator winding
38 is indicated as being of the well known "double-layer
lap winding" arrangement wherein each stator slot con-
tains radially inner and outer layers of turns or coil sides
insulated from each other by insulating spacers (not
shown) which extend through the slots between the coil
sides. In the end turns of the winding 38, end coil or
phase insulators 41 are disposed between these radially
inner and outer layers of turns or coil sides for insulating
purposes. As seen in FIG. 3 each phase insulator 41 ex-
tends circumferentially under end coils from each phase
group of coils and serves to insulate each phase group of
coils of a given phase from another phase group of coils
of a different phase. In the illustrated embodiment, each
phase insulator extends circumferentially under end turns
or end coils from five stator slots because in the illus-
trated motor there are five coils per pole or phase group
of coils. Conventional slot liners 42 of suitable in-
sulating material serve to insulate the winding coils in
the stator slots from the stator core 36.

In order to provide thermal protection for the motor
10 a thermal protective device 43 is disposed within end
turns of the winding 38, as seen more clearly in FIG. 3,
and connected in a thermal protective circuit 44 which
is adapted to interrupt the supply of power to the motor
upon sensing a predetermined temperature. The thermal
protective device 43 is shown for illustration in FIG. 4 as
including a metal housing 45 containing a simple tem-
perature responsive switch having a pair of normally
closed contacts 46 and 47 adapted to be opened by a
thermal responsive element 48 when the element reaches
a predetermined temperature.

The thermal responsive element 48 is shown as a bi-
metal strip with contact 47 secured thereto and which
normally biases contact 47 into engagement with contact
46. The element 48 is secured to the housing and elec-
trically connects the contact 47 to the housing. Contact
46 is connected through an insulated terminal 49 mounted
on one end of the housing to an external lead 50. An-
other lead 52 is connected, as by a solder connection, to
the housing 45 to provide an external lead electrically
connected to contact 47. The housing 45 is shown disposed in an insulating sleeve member 54 of relatively thin insulating material which serves to provide suitable insulation between the housing and end turns of the winding 38.

As seen in FIG. 1, power is supplied to the motor 10 from a three-phase power supply source 58 through three-phase power supply lines 60 which are connected through a terminal box 62 mounted to the frame 28 to three-phase motor leads 64 of winding 38. The thermal protective circuit 44 shown for illustration in the drawing includes a solenoid operated, three-phase circuit breaker 66 connected in the three supply lines 60 between the power supply source 58 and the motor leads 64. The circuit breaker 66 includes three switches 67 connected respectively in the three supply lines 60 and a solenoid operating coil 68 for operating a switch actuator 69. A spring 70 is connected to the actuator to effect the opening of the three switches when the coil 68 is de-energized. The coil 68 is connected in series with the thermal protective device 43 and a source 69 of supply voltage for operating the circuit breaker. One end of coil 68 is connected by a line 71 to lead 52 of the thermal protective device 43 through a terminal box 72 mounted to the frame 28, and the other end of coil 68 is connected through a line 73 to one side of the source 69; the other side of the source 69 being connected by a line 74 to the lead 50 of the device 43 through the terminal box 72.

The contacts 46 and 47 of the thermal protective device 43 under normal operating conditions are closed or in engagement with each other so that the coil 68 is normally energized by source 69 to maintain the circuit breaker 66 in its closed condition, the condition shown in FIG. 1. Thus, under normal conditions when the temperature of the thermal protective device 43 is below the designated predetermined temperature at which its contacts 46 and 47 are actuated by thermal responsive element 48 to their open position, the motor 10 is supplied power through circuit breaker 66 from the power supply source 58. However, should the temperature of the protective device 43 rise to the abovementioned predetermined temperature as a result of a fault or overload condition on the motor, the switch contacts 46 and 47 of the device 43 move apart to open the protective circuit 44 to thereby deenergize the operating coil of the circuit breaker 66. When the coil 68 is deenergized, the spring 70 effects movement of actuator 69 to open the line switches 67 of the circuit breaker to thereby disconnect the motor from the power supply source 58. While only one thermal protective device 43 is shown in the illustrated embodiment of the present invention, more than one may be used, and in such case, the protective devices may be connected in series with each and the operating coil 68 of the circuit breaker 66. Where a plurality of series connected protective devices 43 are used, the motor will be deenergized even if one of the protective devices fails to function properly. Also, if several such protective devices are positioned adjacent different portions of the winding or adjacent end coils of the different phases in a poly-phase motor, such as the motor shown in the drawing, power to the motor will be interrupted when any one of the protective devices reaches the temperature at which it opens its contacts so that a motor can be protected against conditions wherein the temperature of only a portion of the winding exceeds a predetermined value.

It has been found that when the thermal protective device was merely placed adjacent end turns of the motor winding, there was a considerable time delay before the winding temperatures were sensed by the protective device because much of the heat generated by the adjacent end turns was quickly transferred to the ambient or atmosphere within the motor casing. While the protective device was effective in protecting the motor against overload conditions which caused the winding temperature to increase relatively slowly, it failed to respond quickly enough to effect de-energization of the motor under conditions that caused the winding temperature to increase rapidly. Thus, there was danger of damaging the insulation on the motor winding.

Adequate protection for the motor 10 even if a condition occurs that causes the temperature of the motor winding 38 to rise relatively rapidly, such as under a locked rotor condition, is provided in accordance with the present invention by positioning the thermal protective device 43 adjacent end turn portion 40 of the winding and a heat radiation barrier member 78 adjacent the protective device. The thermal protective device 43 is shown disposed between end turns of the winding 38 in FIG. 3 with a phase insulator 41 adjacent the bottom side of the protective device and, as seen in FIG. 2, with the heat radiation barrier member 78 disposed over the top side of the protective device, as well as over end turns adjacent the protective device. The barrier member 78 is a sheet of insulating material which may be of various shapes but which is shown in FIG. 5 as a channel shaped member having an upper plane wall member 80 and opposed, parallel depending side walls 82 and 84. The barrier member 78 has a width (as measured between the opposed side walls 82 and 84) such that it extends over or covers the protective device 43 and a number of end turns adjacent the protective device that is suitable for transferring a sufficient amount of heat to the protective device. In the illustrated embodiment, the protective device 43 is disposed between adjacent end coils, indicated at 40a and 40b in FIGS. 3 and 6, and the barrier member 78 extends over or covers portions of these end coils adjacent the device 43. The barrier member 78 should be large enough to extend over at least a substantial portion of the device 43 and substantial portions of adjacent end coils 40a and 40b, and it is shown for illustration in the drawing as having a length such that it covers the full length of the device 43. The side walls of member 78 extend along the outer sides of the end coils covered by the barrier member and radially inwardly between adjacent end coils. As seen in FIG. 6, the protective device 43 and the end coils adjacent thereto are disposed between the barrier member 78 and a phase insulator 41 so that the protective device and the end coils adjacent thereto are surrounded or substantially so by insulating material. The protective device 43 and barrier member 78 are secured in place as seen in FIG. 2, by tying cord or string 86 of suitable insulating material which may be used also to secure the end coils in proper position around the stator. In some cases, it may be desired to place the protective device 43 adjacent end turns on the radially inner or rotor side of the end turns 40 of winding 38 and position the barrier member 78 so that it covers or extends over the device 43 and the end turns adjacent thereto.

By employing the heat radiation barrier 78 adjacent the thermal protective device 43 and the end turns adjacent thereto, the barrier member limits the transfer of heat from these end turns to the ambient within the motor casing 14 and increases the transfer of heat therefrom to the protective device so that the protective device quickly responds or senses temperature changes of the winding 38. The barrier member 78 tends to hold the heat dissipated by the end coil portions it covers so that the response time of the protective device is decreased and the temperature of the protective device positioned between the end coils closely follows the temperature of the winding and provides protection even in cases where the winding temperature rises relatively rapidly.

While the barrier member 78 may be in the form of a flat sheet, such as wall 80, without depending side walls 82 and 84, these side walls of the barrier member shown for illustration aid in maintaining the barrier member in place on the stator and also aid in limiting the transfer of heat generated by the end turns of end coils 40a and 40b to the ambient.

Motors employing heat radiation barrier members, such as member 78, in accordance with the present invention, and the same motors without such barrier members were tested under locked rotor conditions. It was found that when power was supplied to a motor having a locked rotor and in which the radiation barrier was not employed, the temperature of the motor winding rose rapidly to values above the desired predetermined maximum permissible value for the winding insulation before the protective device opened its contacts. On the other hand, when the same motor was provided with the heat radiation barrier according to the present invention and energized under locked rotor conditions, the protective device opened its contacts before the winding temperature reached the desired maximum permissible temperature for the winding insulation. Thus, motors provided with the thermal protective means of the present invention were protected against faults or overload conditions even where the temperature of the winding rose at a relatively high rate.

The various insulating parts of the motor 10 may be made of various suitable insulating materials well-known in the art. By the way of example, the phase insulators 41, slot liners 42, slot closures or wedges and coil spacers (not shown), sleeve insulator 54 for the thermal protective device 43, and the heat radiation barrier member 78 may be of well-known insulating materials such as rag base paper type materials or sheet materials based on polyester resins. Tying cord 86 may be made, for example, from cellulose fibers or fibers based on polyester resins.

From the foregoing, it is now apparent that novel thermal protective means for an electric motor meeting the objects set out hereinbefore are provided. It is to be understood that changes and modifications to the form of the invention set forth in the disclosure by way of illustration may be made by those skilled in the art without departing from the true spirit of the invention as defined in the claims which follow.

What I claim is:

1. In an electric motor including a stator having a magnetic core member and a stator winding on the core member with a plurality of coils having end turns extending beyond the opposite ends of the core member, end coil insulating means disposed between end turns of different coils, means for supplying power to said stator winding for effecting energization of said motor, and thermal protective means including thermal responsive switch means for interrupting the supply of power to said stator winding when said switch means senses a predetermined temperature, said switch means being disposed adjacent to end turns of said winding with one side thereof facing said insulating means and responsive to heat emanating from said winding when the motor is energized, the combination therewith comprising heat radiation barrier means of insulating material extending over a substantial portion of the opposite side of said switch means and portions of a selected number of the end turns adjacent said switch means to limit the heat emanating from said portions of said selected number of end turns to the atmosphere and increase the transfer of heat emanating from said portions of said selected number of end turns to said switch means to promote rapid response of said switch means to changes in temperature of said stator winding.

2. In an electric motor including a stator having a magnetic core member and a stator winding on the core member with a plurality of coils having end turns extending beyond the opposite ends of the core member, end coil insulating means disposed between end turns of different coils, means for supplying power to said stator winding for effecting energization of said motor, and thermal protective means including thermal responsive switch means interrupting the supply of power to said stator winding when said switch means senses a predetermined temperature, said switch means being disposed between end turns of said winding with one side thereof facing said insulating means and responsive to heat emanating from said winding when the motor is energized, the combination therewith comprising heat radiation barrier means of insulating material having a main wall and opposed side walls depending from said main wall, said barrier means being disposed adjacent said switch means with said main wall extending over a substantial portion of the opposite side of said switch means and portions of a selected number of end turns adjacent each of the other opposite sides of said switch means and with said switch means and said portions of said selected number of turns disposed between said opposed side walls to limit the heat emanating from said portions of said selected number of end turns to the atmosphere and increase the transfer of heat emanating from said portions of said selected number of end turns to said switch means to promote rapid response of said switch means to changes in temperature of said stator winding.

3. In an electric motor having a stator including a magnetic core, and a stator winding on said core including a plurality of pole groups of coils having end turns extending beyond the ends of said core, end coil insulating means disposed between end turns of adjacent pole groups of coils, and means for supplying electric power to said winding to effect energization thereof, the combination therewith of thermal responsive bimetal switch means for interrupting the supply of said electric power to said winding when the temperature of said winding exceeds a predetermined value, said switch means being disposed within the end turns of one of said pole groups of coils adjacent said insulating means in direct heat exchange contact with some of the end turns thereof and with portions of end turns of said one pole group disposed on each of opposite sides of said switch means in intimate heat transfer relationship therewith, and heat radiation barrier means of insulating sheet material extending over a substantial portion of said switch means and said end turn portions with said switch means and said end turn portions disposed between said insulating means and said barrier means to limit the heat emanating from said end turn portions to the atmosphere and increase the transfer of said heat to said switch means to promote rapid response of said switch means to changes in the temperature of said winding.

4. In an electric motor having a stator including a magnetic core, and a stator winding on said core including a plurality of pole groups of coils having end turns extending beyond the ends of said core, end coil insulating means of insulating sheet material disposed between end turns of adjacent pole groups of coils, and means for supplying electric power to said winding to effect energization thereof, the combination therewith of thermal responsive bimetal switch means for interrupting the supply of said electric power to said winding when the temperature of said winding exceeds a predetermined value, said switch means being disposed within the end turns of one of said pole groups of coils adjacent said insulating means in direct heat exchange contact with some of the end turns thereof and with portions of end turns of said one pole group disposed on each of opposite sides of said switch means in intimate heat transfer realtionship therewith, and heat radiation barrier means of insulating sheet material having a main wall portion and a side wall portion extending angularly from said main wall portion, said barrier means being disposed adjacent said switch means with said main wall portion extending over a substantial portion of said switch means and said end turn portions and with said side wall portion extending toward said insulating means, said switch means and said end turn portions being disposed between said main wall portion and said insulating means to limit the heat emanating from said end turn portions to the atmosphere and increase the transfer of said heat to said switch means to promote rapid response of said switch means to changes in the temperature of said winding.

5. In an electric motor having a stator including a magnetic core having a plurality of coil slots, and a stator winding disposed in said slots and including a plurality of pole groups of coils having end turns extending beyond the ends of said slots, end coil insulating means of sheet material disposed between end turns of adjacent pole groups of coils, and means for supplying electric power to said winding to effect energization thereof, the combination therewith of thermal responsive bimetal switch means for interrupting the supply of said electric power to said winding when the temperature of said winding exceeds a predetermined value, said switch means being disposed within the end turns of one of said pole groups of coils adjacent said end coil insulating means in direct heat exchange contact with some of the end turns thereof and with portions of end turns of said one pole group disposed on each of opposite sides of said switch means in intimate heat transfer relationship therewith, a heat radiation barrier member of insulating sheet material having a main wall and a pair of opposed side walls defining a channel, and means securing said barrier member to the end turns of said one pole group with said main wall extending over a substantial portion of said switch means and said end turn portions and with said switch means and said end turn portions disposed within said channel and between said main wall and said end coil insulating means to limit the heat emanating from said end turn portions to the atmosphere and increase the transfer of said heat to said switch means to promote rapid response of said switch means to changes in the temperature of said winding.

References Cited by the Examiner
UNITED STATES PATENTS

| | | | |
|---|---|---|---|
| 1,947,078 | 2/34 | Cobb | 310—68.3 |
| 2,538,476 | 1/51 | Smith | 310—68.3 |
| 2,909,719 | 10/59 | Dubberley | 310—68.3 |

MILTON O. HIRSHFIELD, *Primary Examiner.*